(12) United States Patent
Hanusch et al.

(10) Patent No.: US 7,349,709 B2
(45) Date of Patent: Mar. 25, 2008

(54) RATE DEPENDENT TRANSMISSION GAIN CONTROL FOR WLAN SYSTEMS

(75) Inventors: Thomas Hanusch, Coswig (DE);
Sascha Beyer, Ottendorf-Okrilla (DE);
Michael Schmidt, Dresden (DE)

(73) Assignee: Advanced Micro Devices, Inc.,
Sunnyvale, CA (US)

( * ) Notice: Subject to any disclaimer, the term of this patent is extended or adjusted under 35 U.S.C. 154(b) by 164 days.

(21) Appl. No.: 10/965,082

(22) Filed: Oct. 14, 2004

(65) Prior Publication Data

US 2005/0215258 A1   Sep. 29, 2005

(30) Foreign Application Priority Data

Mar. 25, 2004   (DE)   ............... 10 2004 014 739

(51) Int. Cl.
*H04Q 7/20* (2006.01)
(52) U.S. Cl. ............... 455/456.1; 455/127.2; 455/136; 455/138; 455/41.1; 455/41.2
(58) Field of Classification Search ............ 455/127.2, 455/136, 138, 41.1, 41.2
See application file for complete search history.

(56) References Cited

U.S. PATENT DOCUMENTS

| | | | | |
|---|---|---|---|---|
| 6,463,264 | B1 * | 10/2002 | Obara | 455/127.2 |
| 6,643,522 | B1 * | 11/2003 | Young | 455/552.1 |
| 6,661,999 | B1 | 12/2003 | Johnson et al. | |
| 6,697,415 | B1 * | 2/2004 | Mahany | 375/130 |
| 6,735,420 | B2 * | 5/2004 | Baldwin | 455/127.2 |
| 6,748,200 | B1 * | 6/2004 | Webster et al. | 455/234.1 |
| 6,763,228 | B2 | 7/2004 | Prentice et al. | |
| 6,868,263 | B2 | 3/2005 | Filipovic | |
| 2002/0061763 | A1 * | 5/2002 | Weissman | 455/522 |
| 2003/0104831 | A1 | 6/2003 | Razavilar et al. | |
| 2005/0089123 | A1 * | 4/2005 | Spiegel | 375/345 |
| 2006/0002383 | A1 * | 1/2006 | Jeong et al. | 370/360 |

* cited by examiner

*Primary Examiner*—Rafael Perez-Gutierrez
*Assistant Examiner*—Charles Shedrick
(74) *Attorney, Agent, or Firm*—Meyertons Hood Kivlin Kowert & Goetzel, P.C.; B. Noël Kivlin

(57) ABSTRACT

A WLAN (Wireless Local Area Network) transmission technique is provided where data is transmitted in two or more different transmission modes at different transmission rates. A transmission gain is determined to be applied when transmitting data. The transmission gain is determined to be transmission mode dependent such that the transmission gain in a first transmission mode is greater than the transmission gain in a second transmission mode if the transmission rate in the first transmission mode is lower than the transmission rate in the second transmission mode.

26 Claims, 3 Drawing Sheets

RATE DEPENDENT TRANSMISSION GAIN CONTROL FOR WLAN SYSTEMS

BACKGROUND OF THE INVENTION

1. Field of the Invention

The invention generally relates to WLAN (Wireless Local Area Network) transmitters and corresponding integrated circuit chips and methods, and in particular to WLAN transmission techniques where data is transmitted in two or more different transmission modes.

2. Description of the Related Art

A wireless local area network is a flexible data communications system implemented as an extension to or as an alternative for, a wired LAN. Using radio frequency or infrared technology, wireless LANs transmit and receive data over the air, minimizing the need for wired connections. Thus, wireless LANs combine data connectivity with user mobility.

Most WLAN systems use spread spectrum technology, a wide-band radio frequency technique developed for use in reliable and secure communication systems. The spread spectrum technology is designed to trade-off bandwidth efficiency for reliability, integrity and security. Two types of spread spectrum radio systems are frequently used: FHSS (Frequency Hopping Spread Spectrum) and DSSS (Direct Sequence Spread Spectrum) systems.

The standard defining and governing wireless local area networks that operate in the 2.4 GHz spectrum, is the IEEE 802.11 standard. To allow higher data rate transmissions, the standard was extended to the 802.11b standard that allows data rates of 5.5 and 11 Mbps in the 2.4 GHz spectrum. This extension is backwards compatible as far as it relates to direct sequence spread spectrum technology, but it adopts a new modulation technique called CCK (Complementary Code Keying) which allows the speed increase.

The CCK modulation can generally be described as a modification of MOK (M-ary Orthogonal Keying) modulation using codes of complex symbol structure.

The CCK technology allows for multi-channel operation and employs the same chip rate and spectrum shape as the 802.11 Barker code spread functions.

CCK can be considered as a form of M-ary code word modulation where one of M unique signal codewords is chose for transmission.

Further extensions to the IEEE 802.11 standard exist. For instance, the IEEE 802.11a and 802.11g specifications use the OFDM (Orthogonal Frequency Division Multiplexing) technique which is a wireless transmission technique that splits signals into sub signals that are then transmitted at different frequencies simultaneously. The 802.11g version of ODFM uses a combination of BPSK (Binary Phase Shift Keying), QPSK (Quadrature Phase Shift Keying), and QAM (Quadrature Amplitude Modulation), depending on the chosen data rate.

Thus, a variety of different modulation types and methods exist within 802.11 compliant WLAN systems. Not all of the possible transmission modes have to be supported by each individual WLAN device, but multi-mode WLAN devices exist that support at least part of the possible modes.

An example of a conventional WLAN transceiver device is the Am1772 wireless LAN chip set which is depicted in FIG. 1. As apparent from the figure, the device comprises a baseband/MAC (Medium Access Control) unit 100 which includes a baseband section 110 and an MAC section 115. Both sections are connected via a baseband/MAC interface unit 120 which is media independent.

The MAC section 115 comprises an input/output bus host interface which is connected via an I/O bus to an external I/O bus host interface 180. The input/output bus host interface of the MAC section 115 is further connected to a frame composer 145 and a timer 150.

The baseband section 110 comprises baseband inner and outer receiver units 125, 130 and a baseband transmitter unit 135 to perform baseband data processing in both directions. Baseband data processing refers to signal processing after having shifted the frequency from the radio frequency domain in the reception path, and before doing the shift in the transmission path. The baseband section 110 further comprises a control logic 140 for controlling the baseband receiver and transmitter units 125, 130, 135 and the baseband/MAC interface unit 120.

The WLAN transceiver device of FIG. 1 further comprises an RF (Radio Frequency) transceiver 105 that is connected to the baseband/MAC unit 100 to interchange data which is received or which is to be transmitted. As the interchanged data is digital data, the RF transceiver 105 comprises digital-to-analog converters 165, 170 in the transmission path and analog-to-digital converters 155, 160 in the reception path. The reception path further comprises an LNA (Low Noise Amplifier) and an AGC (Automatic Gain Control) unit for selectively adjusting the reception gain. Further, there is a VCO (Voltage Controlled Oscillator) unit which is connected to a PLL (Phase Locked Loop) unit.

As apparent from FIG. 1, the WLAN transceiver device further comprises a power amplifier 185 which receives an analog output signal to be transmitted, from the RF transceiver 105. The power amplifier 185 is controlled by the control logic 140 of the baseband section 110 in the baseband/MAC unit 100 via a power amplifier control signal. The control logic 140 further provides a transmitter/receiver switch signal to switch operation of the device between a reception mode and a transmission mode. Further, the control logic 140 provides an antenna switch signal for selecting one of two (or more) antennae 190.

When operating a WLAN transmitter device such as that of FIG. 1, a number of factors need to be taken into account to achieve optimum transmission conditions. For instance, the output power with which data is transmitted is a crucial point. Evidently, when increasing the output transmission power, the signal-to-noise ratio at the WLAN receivers that receive the transmitted signals is increased. However, another crucial point is the signal quality which should be as high as possible. As there are non-linearities in the power amplifier 185, the signal quality decreases when the output power is increased since there may occur severe signal distortions. This may lead to a situation where the signal-to-noise ratio is low but signal demodulation and decoding nevertheless leads to higher error rates at the receiver because of the reduced signal quality.

It is therefore often found difficult to decide on the compromise between signal-to-noise ratio and signal quality. This may lead to situations where a WLAN receiver cannot successfully demodulate and decode a signal either because of too much noise (i.e. too weak data signals) or because of distorted signals.

SUMMARY OF THE INVENTION

An improved WLAN transmission technique is provided that allows for optimum transmission gain selection in a WLAN multi-mode environment.

According to one embodiment, a WLAN transmitter device is provided that is capable of transmitting data in two or more different transmission modes at different transmission rates. The WLAN transmitter device comprises a transmission gain controller for determining a transmission gain to be applied when transmitting data, and a data transmission section for transmitting data at a transmission gain determined by the transmission gain controller. The transmission gain determined by the transmission gain controller is transmission mode dependent. The transmission gain applied in a first one of the two or more different transmission modes is greater than the transmission gain applied in a second one of the two or more different transmission modes if the transmission rate in the first one of the two or more different transmission modes is smaller than the transmission rate in the second one of the two or more different transmission modes.

In another embodiment, there is provided an integrated circuit chip providing WLAN transmitter capabilities for transmitting data in two or more different transmission modes at different transmission rates. The integrated circuit chip comprises a transmission gain control circuit for determining a transmission gain to be applied when transmitting data, and a data transmission circuit for transmitting data at a transmission gain determined by the transmission gain control circuit. The transmission gain determined by the transmission gain control circuit is transmission mode dependent. The transmission gain applied in a first one of the two or more different transmission modes is greater than the transmission gain applied in a second one of the two or more different transmission modes if the transmission rate in the first one of the two or more different transmission modes is smaller than the transmission rate in the second one of the two or more different transmission modes.

According to a further embodiment, a WLAN transmission method of transmitting data in two or more different transmission modes at different transmission rates is provided. The method comprises determining a transmission gain to be applied when transmitting data, and transmitting data at a determined transmission gain. The determined transmission gain is transmission mode dependent. The transmission gain applied in a first one of the two or more different transmission modes is greater than the transmission gain applied in a second one of the two or more different transmission modes if the transmission rate in the first one of the two or more different transmission modes is smaller than the transmission rate in the second one of the two or more different transmission modes.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
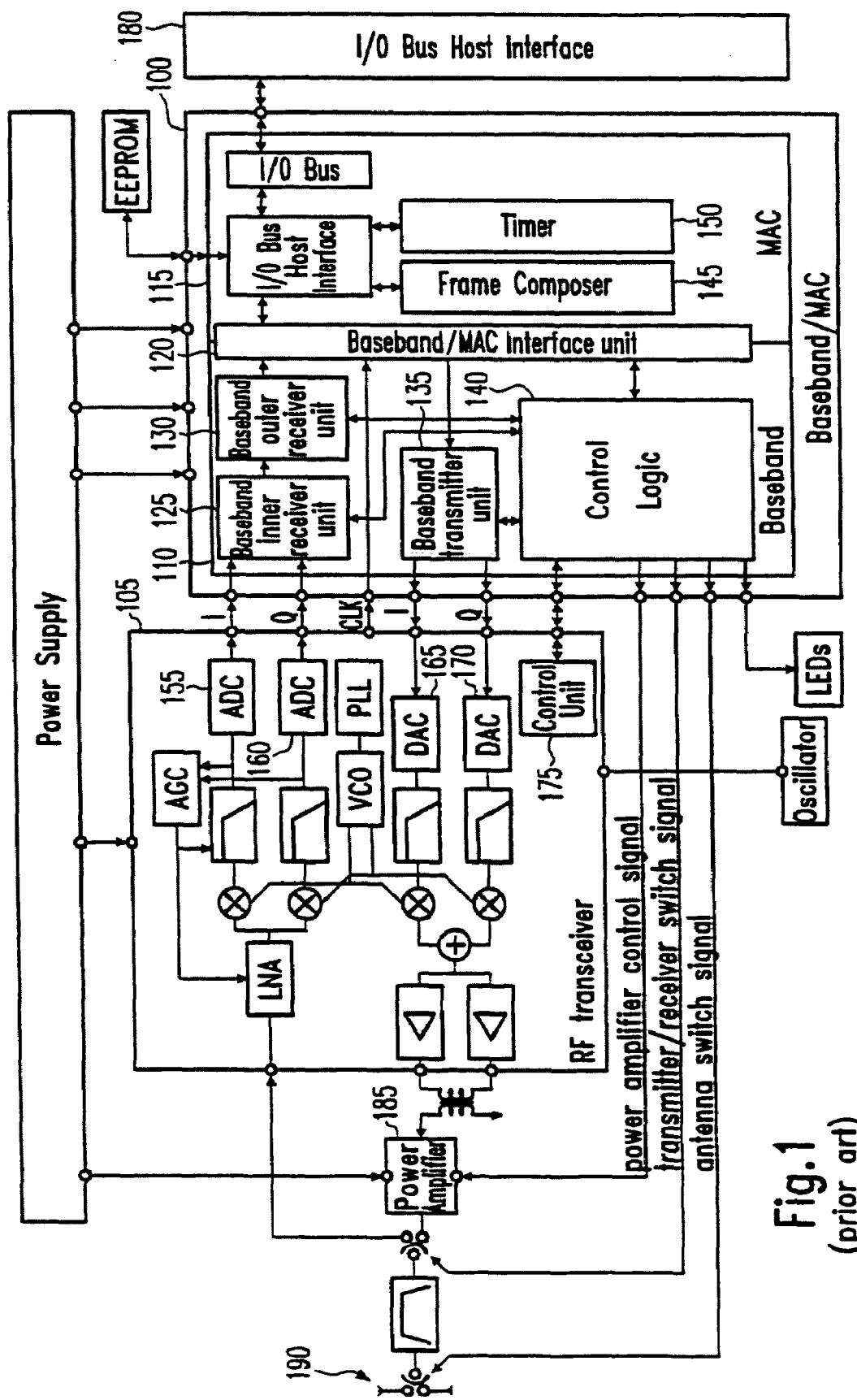
FIG. 1 is a block diagram illustrating a conventional WLAN chip set.
Figure 2:
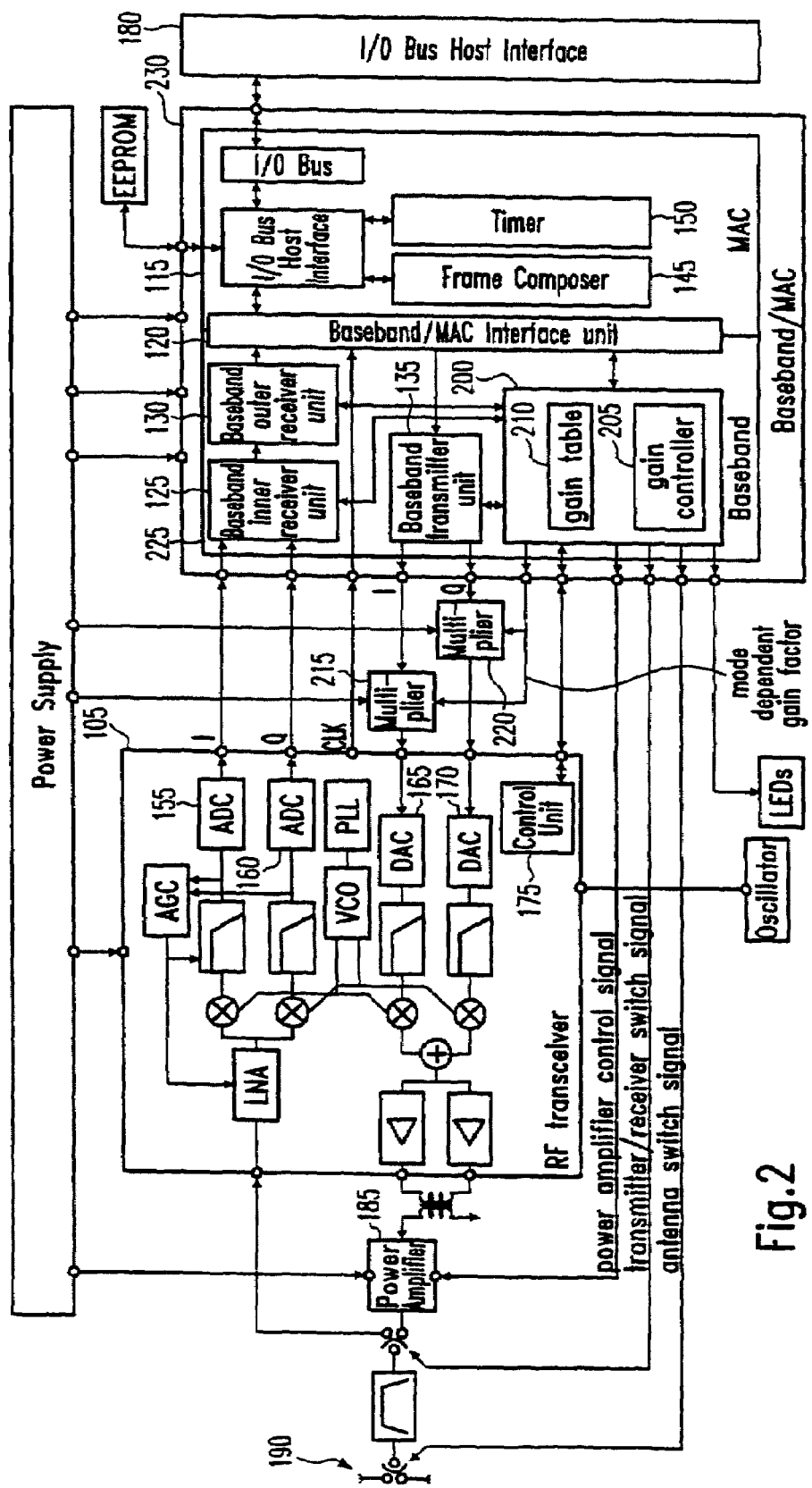
FIG. 2 is a block diagram illustrating a WLAN transmitter device according to an embodiment.

Referring now to FIG. 2, a WLAN transmitter device according to an embodiment is depicted. Comparing the block diagram of FIG. 2 with that of FIG. 1, it is apparent that the baseband/MAC unit 230 comprises in its baseband section 225 a control logic 200 which comprises a gain controller 205 and a gain table 210. Further, two multipliers 215, 220 are provided between the baseband/MAC unit 230 and the RF transceiver 105. The multipliers 215, 220 multiply the digital in-phase (I) and quadrature-phase (Q) output signals of the baseband transmitter unit 135 with a mode (or rate) dependent gain factor that is provided by the control logic 140. The multiplication results are then provided to the digital-to-analog converters 165, 170 of the RF transceiver 105 to be converted to analog signals for the purpose of being provided to the power amplifier 185 so that they can be transmitted.

The gain controller 205 of control logic 200 determines a transmission gain which is transmission mode dependent. More particularly, the gain factor determined by the transmission gain controller 205 depends on the transmission mode or rate of the respective transmission mode such that transmission modes of higher rates have lower gain factors.

The approach according to the embodiments of making the gain factor dependent on the transmission mode or transmission rate is based on the finding that lower transmission rate modes require less signal quality than higher rate modes. In other words, higher rate modes require the signal quality to be more accurate than lower rate modes. Thus, the embodiments are based on the conclusion that data signals may be transmitted at higher output power in lower rate modes even though, due to non-linearities of the power amplifier 185, the signal quality is then decreased. This allows for transmitting lower rate data at a higher power than in conventional WLAN transmitters. When regarding higher transmission rate modes, the embodiments select lower output powers to make sure that the signal quality necessary for the receiver to successfully demodulate and decode the data is observed.

Thus, the WLAN transmitter device according to the embodiment of FIG. 2 determines a specific gain factor for each transmission rate and supplies this gain factor to the multipliers 215, 220. In the embodiment of FIG. 2, the gain factors are stored in a gain table 210 vis-à-vis the respective transmission rates. In this embodiment, the gain controller 205 determines the current transmission rate, accesses the gain table 210 to read the gain factor that is stored in association with the respective transmission rate, and outputs the obtained gain factor.

In an embodiment, different transmission rates always have different gain factors associated. In this embodiment, whenever two different transmission modes have the same transmission rate, the respective gain factors are equal. Thus, the selection is then done solely dependent on the transmission rate.

In another embodiment, the gain table 210 that is accessed by the gain controller 205 stores gain factors in close relationship to transmission modes. That is, each mode has an entry in the gain table 210 and is associated with a gain factor. In this embodiment, individual different transmission modes may have different gain factors even though the transmission rate is the same. This may be suitable in particular in cases where different transmission modes have different signal quality constraints even though the transmission rate is the same.

In the embodiment where the gain table 210 is a mode/gain table, the gain controller 205 of the control logic 200 determines the current transmission mode, queries the gain table 210 to obtain the respective gain factor, and applies the obtained gain factor to the multipliers 215, 220.

In yet another embodiment, the gain controller 205 performs run time calculation of the gain factor without requiring a rate/gain or mode/gain table 210. In this embodiment, the gain controller 205 has a predefined transmission gain calculation algorithm implemented that may represent a predefined function to be calculated. This function may have the transmission rate and/or the transmission mode as input values and the gain factor as an output value. In this embodiment, there is no need to store gain factors.

The gain calculation function in an embodiment where the function receives the transmission rate as input may be a mathematical function that defines the gain factor to monotonically decrease with the transmission rate. In another embodiment, the function may be defined to have a constant region at low transmission rates and/or high transmission rates so that a range of transmission rates may exist where the gain factor is not changed. It is to be noted that in one embodiment, the gain calculation function may be a uniformly continuous function, while in another embodiment, the function may have steps at least in certain input value ranges.

The gain controller 205 and the gain table 210 are shown in FIG. 2 to be comprised in the control logic 200 of the baseband section 225 of the baseband/MAC unit 230. While in this embodiment the gain controller 205 may be easily implemented using control circuits which are already present in the device, it is to be noted that further embodiments exist where the gain control is performed in the RF transceiver unit 105 or in an extra unit which is separated from both the RF transceiver 105 and the baseband/MAC unit 230.

Further, the embodiment of FIG. 2 shows the gain factors to be applied to the digital signals which are output from the baseband/MAC unit 230 before being converted to analog signals in the RF transceiver unit 105. While this again allows for an easy implementation using existing digital circuits in the arrangement, further embodiments exist where the gain factor is applied in the baseband section 225 or in the RF transceiver 105 before or after the digital-to-analog converters 165, 170. Further, the power amplifier control signal that is provided by the control logic 200 to the power amplifier 185 may be used to control the power amplifier 185 such that the output power is increased dependent on the transmission mode or rate as discussed above.

Thus, a multi-mode WLAN transmission technique is provided where an optimum compromise between signal-to-noise ratio and signal distortions is found for each transmission mode. Examples of transmission modes are those applying DSSS, FHSS and/or OFDM modulation types and BPSK, QPSK, CCK and/or QAM modulation methods. To give an example illustrating various transmission rates possible when applying different transmission modes, the embodiments may allow for finding an optimum for some or all of the following data rates and modulation schemes: 1, 2, 5.5, 11, 6, 9, 12, 18, 24, 36, 48 and 54 Mbps (DSSS/CCK/BPSK/QPSK/16-QAM/64-QAM).

As apparent from FIG. 2, the term "WLAN transmitter device" relates to any communication device that is capable of transmitting data in a WLAN system, irrespective of whether the device can also receive data. That is, the embodiments also relate to transceiver devices since transceivers have transmission capabilities. In a further embodiment, the WLAN transmitter devices according to the embodiments may be computer chipsets.

The embodiments are particularly suitable in IEEE 802.11 compliant systems possibly including any extensions of the basic standard.

Figure 3:
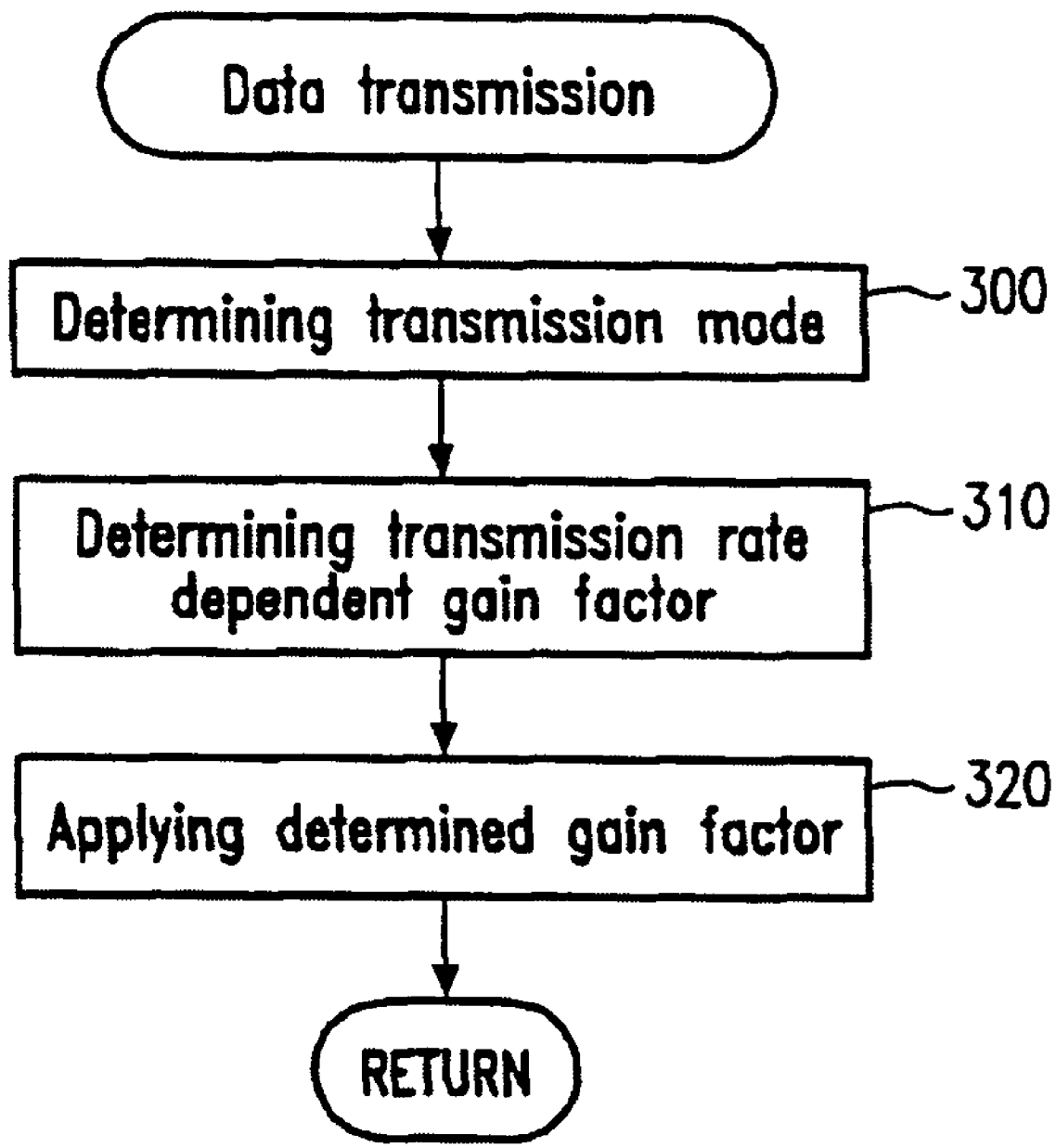
FIG. 3 is a flow chart illustrating the process of transmitting data according to an embodiment.

Referring now to FIG. 3, a data transmission process according to an embodiment is shown. In step 300, the gain controller 205 determines the current transmission mode or transmission rate. As described above, this may be done by querying a mode/gain or rate/gain table 210 or by applying a predefined calculation algorithm. The gain controller 205 then determines the mode or rate dependent gain factor in step 310 and applies the determined gain factor in step 320.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar have not been described herein in order to not unnecessarily obscure the invention described herein. Accordingly, it is to be understood that the invention is not to be limited by the specific illustrative embodiments, but only by the scope of the appended claims.

What is claimed is:

1. A WLAN (Wireless Local Area Network) transmitter device capable of transmitting data in two or more different transmission modes at different transmission rates, comprising:
    a transmission gain controller for determining a transmission gain to be applied when transmitting data; and
    a data transmission section for transmitting data at a transmission gain determined by said transmission gain controller,
    wherein said transmission gain determined by said transmission gain controller is transmission mode dependent, with the transmission gain applied in a first one of said two or more different transmission modes being greater that the transmission gain applied in a second one of said two or more different transmission modes if the transmission rate in said first one of said two or more different transmission modes is smaller than the transmission rate in said second one of said two or more different transmission modes; and
    wherein said transmission gain controller is adapted to determine the transmission gain of said second one of said two or more different transmission modes by reading a mode dependent or a rate dependent gain multiplication factor from a gain table storing mode dependent or rate dependent transmission gain multiplication factors; and
    wherein the mode dependent or the rate dependent gain multiplication factor read from said gain table is to be applied to a multiplier by said data transmission section.

2. The WLAN transmitter device of claim 1 wherein said WLAN transmitter device is adapted to apply different modulation types in different transmission modes.

3. The WLAN transmitter device of claim 2 wherein said modulation types include one or more of DSSS (Direct Sequence Spread Spectrum), FHSS (Frequency Hopping Spread Spectrum) and OFDM (Orthogonal Frequency Division Multiplexing) modulation types.

4. The WLAN transmitter device of claim 1 wherein said WLAN transmitter device is adapted to apply different modulation methods in different transmission modes.

5. The WLAN transmitter device of claim 4 wherein said modulation methods include one or more of BPSK (Binary Phase Shift Keying), QPSK (Quadrature Phase Shift Keying), CCK (Complementary Code Keying), and QAM (Quadrature Amplitude Modulation) modulation methods.

6. The WLAN transmitter device of claim 1 wherein said transmission gain controller is adapted to access the gain table having stored therein transmission gain multiplication factors for each of said two or more different transmission modes.

7. The WLAN transmitter device of claim 1 wherein said transmission gain controller is adapted to determine a currently used transmission rate and access the gain table having stored therein transmission gain multiplication factors for each transmission rate.

8. The WLAN transmitter device of claim 1 wherein said data transmission section comprises an RF (Radio Frequency) transmission section and the WLAN transmitter device further comprises:
    a baseband section connected to said RF transmission section, for performing baseband data processing,
    wherein said transmission gain controller is comprised in said baseband section.

9. The WLAN transmitter device of claim 8 wherein said baseband section comprises a baseband transmitter unit arranged for outputting digital data to be transmitted, said RF transmission section comprises a digital-to-analog converter for converting digital data to be transmitted to an analog signal, and said data transmission section further comprises the multiplier for multiplying the digital data output from said baseband transmitter unit with the gain multiplication factor corresponding to said transmission gain determined by said transmission gain controller, to provide digital data to be provided to said digital-to-analog converter.

10. The WLAN transmitter device of claim 9 wherein said multiplier is comprised in said baseband section.

11. The WLAN transmitter device of claim 9 wherein said multiplier is comprised in said RF transmission section.

12. The WLAN transmitter device of claim 1 being IEEE 802.11 compliant.

13. The WLAN transmitter device of claim 7, wherein each of said different transmission rates is associated with a different gain multiplication factor with respect to other ones of said different transmission rates.

14. The integrated circuit chip providing WLAN (Wireless Local Area Network) transmitter capabilities for transmitting data in two or more different transmission modes at different transmission rates, comprising:
    a transmission gain control circuit for determining a transmission gain to be applied when transmitting data; and
    a data transmission circuit for transmitting data at a transmission gain determined by said transmission gain control circuit,
    wherein said transmission gain determined by said transmission gain control circuit is transmission mode dependent, with the transmission gain applied in a first one of said two or more different transmission modes being greater than the transmission gain applied in a second one of said two or more different transmission modes if the transmission rate in said first one of said two or more different transmission modes is smaller than the transmission rate in said second one of said two or more different transmission modes; and
    wherein said transmission gain control circuit is adapted to determine the transmission gain of said second one of said two or more different transmission modes by reading one of a mode dependent or a rate dependent gain multiplication factor from a gain table storing mode dependent or rate dependent transmission gain multiplication factors; and
    wherein the mode dependent or the rate dependent gain multiplication factor is read from said gain multiplication table is to be applied to a multiplier by said data transmission circuit.

15. A WLAN (Wireless Local Area Network) transmission method of transmitting data in two or more different transmission modes at different transmission rates, the method comprising:
    determining a transmission gain to be applied when transmitting data; and
    transmitting data at a determined transmission gain,
    wherein said determined transmission gain is transmission mode dependent, with the transmission gain applied in a first one of said two or more different transmission modes being greater than the transmission gain applied in a second one of said two or more different transmission modes if the transmission rate in said first one of said two or more different transmission modes is smaller than the transmission rate in said second one of said two or more different transmission modes; and
    wherein said transmission gain of said second one of said two or more different transmission modes is obtained by reading one of a mode dependent or a rate dependent gain multiplication factor from a gain table storing mode dependant or rate dependent transmission gain multiplication factors, and wherein the mode dependent or rate dependent gain multiplication factor read from the gain table is supplied to a multiplier.

16. The WLAN transmission method of claim 15 wherein different modulation types are applied in different transmission modes.

17. The WLAN transmission method of claim 16 wherein said modulation types include one or more of DSSS (Direct Sequence Spread Spectrum), FHSS (Frequency Hopping Spread Spectrum) and OFDM (Orthogonal Frequency Division Multiplexing) modulation types.

18. The WLAN transmission method of claim 15 wherein different modulation methods are applied in different transmission modes.

19. The WLAN transmission method of claim 18 wherein said modulation methods include one or more of BPSK (Binary Phase Shift Keying), QPSK (Quadrature Phase Shift Keying), CCK (Complementary Code Keying), and QAM (Quadrature Amplitude Modulation) modulation methods.

20. The WLAN transmission method of claim 15 wherein determining a transmission gain comprises:
    accessing the gain table having stored therein transmission gain multiplication factors for each of said two or more different transmission modes.

21. The WLAN transmission method of claim 15 wherein determining a transmission gain comprises:
    determining a currently used transmission rate; and
    accessing the gain table having stored therein transmission gain multiplication factors for each transmission rate.

22. The WLAN transmission method of claim 15 wherein the data transmission is performed by an RF (Radio Frequency) transmission section and the method further comprises:

performing baseband data processing in a baseband section connected to said RF transmission section, wherein the transmission gain is determined by said baseband section.

23. The WLAN transmission method of claim 22 further comprising:

multiplying digital data output from said baseband section with the gain multiplication factor corresponding to said determined transmission gain to provide digital data to be provided to said RF transmission section.

24. The WLAN transmission method of claim 23 wherein the multiplication is performed by said multiplier in the baseband section.

25. The WLAN transmission method of claim 23 wherein the multiplication is performed by said multiplier in the RF transmission section.

26. The WLAN transmission method of claim 15 adapted to operate an IEEE 802.11 compliant WLAN transmitter device.

* * * * *